(12) United States Patent
Bowers

(10) Patent No.: US 7,661,222 B1
(45) Date of Patent: Feb. 16, 2010

(54) FISH HOLDING APPARATUS AND METHOD OF USING SAME

(76) Inventor: Loren E. Bowers, P.O. Box 904, Fillmore, CA (US) 93016

( * ) Notice: Subject to any disclaimer, the term of this patent is extended or adjusted under 35 U.S.C. 154(b) by 0 days.

(21) Appl. No.: 12/104,329

(22) Filed: Apr. 16, 2008

(51) Int. Cl.
A01K 97/00 (2006.01)

(52) U.S. Cl. .......................................... 43/4

(58) Field of Classification Search .................. 43/4, 43/5; 119/215, 200; 269/287; 294/19.1, 294/19.3
See application file for complete search history.

(56) References Cited

U.S. PATENT DOCUMENTS

| | | | |
|---|---|---|---|
| 1,233,074 A * | 7/1917 | Loflin ......................... 294/19.3 |
| 2,653,048 A | 9/1953 | Novak |
| 2,741,061 A | 4/1956 | Harrison |
| 2,885,814 A * | 5/1959 | Schlador ........................... 43/4 |
| 2,929,166 A * | 3/1960 | Sneide .............................. 43/4 |
| 3,420,563 A | 1/1969 | Witt |
| 3,556,507 A | 1/1971 | Haskell et al |
| 3,921,327 A | 11/1975 | Casazza |
| 3,968,588 A | 7/1976 | Peterson, Sr. |
| 3,978,605 A * | 9/1976 | Maruniak ........................ 43/5 |
| 4,196,538 A | 4/1980 | Crone |
| 4,711,000 A | 12/1987 | Bedsole |
| 4,783,926 A * | 11/1988 | McKinney et al. ............... 43/5 |
| 4,854,626 A * | 8/1989 | Duke ......................... 294/19.1 |
| 5,054,226 A * | 10/1991 | Hart ............................... 43/4 |
| 5,465,522 A * | 11/1995 | Varda ............................. 43/4 |
| 6,145,476 A * | 11/2000 | Tempel ...................... 119/215 |
| 6,389,731 B1 * | 5/2002 | Freeman .......................... 43/4 |
| 7,191,536 B1 * | 3/2007 | Bailey .......................... 33/511 |
| 7,207,132 B1 * | 4/2007 | Parsons .......................... 43/4 |
| 2003/0106254 A1 * | 6/2003 | Ondusko .......................... 43/4 |

* cited by examiner

Primary Examiner—Kurt Rowan
(74) Attorney, Agent, or Firm—Christie, Parker & Hale, LLP.

(57) ABSTRACT

Fish holding apparatuses and methods of using the same are disclosed. Embodiments of a fish holding apparatus include: a first plate; a second plate coupled to the first plate, the second plate rotatable relative to the first plate about a horizontal rotation axis proximate and substantially parallel to a bottom edge of the first plate; a biasing member configured to bias the fish holding apparatus toward a closed position; and a holding mechanism configured to maintain the fish holding apparatus in an open position. Other embodiments of a fish holding apparatus (a "caliper") configured to hold open the mouth of a fish include an elongated wire including: two ends having prongs; two arms; and a spring loop configured to provide a spring force.

11 Claims, 9 Drawing Sheets

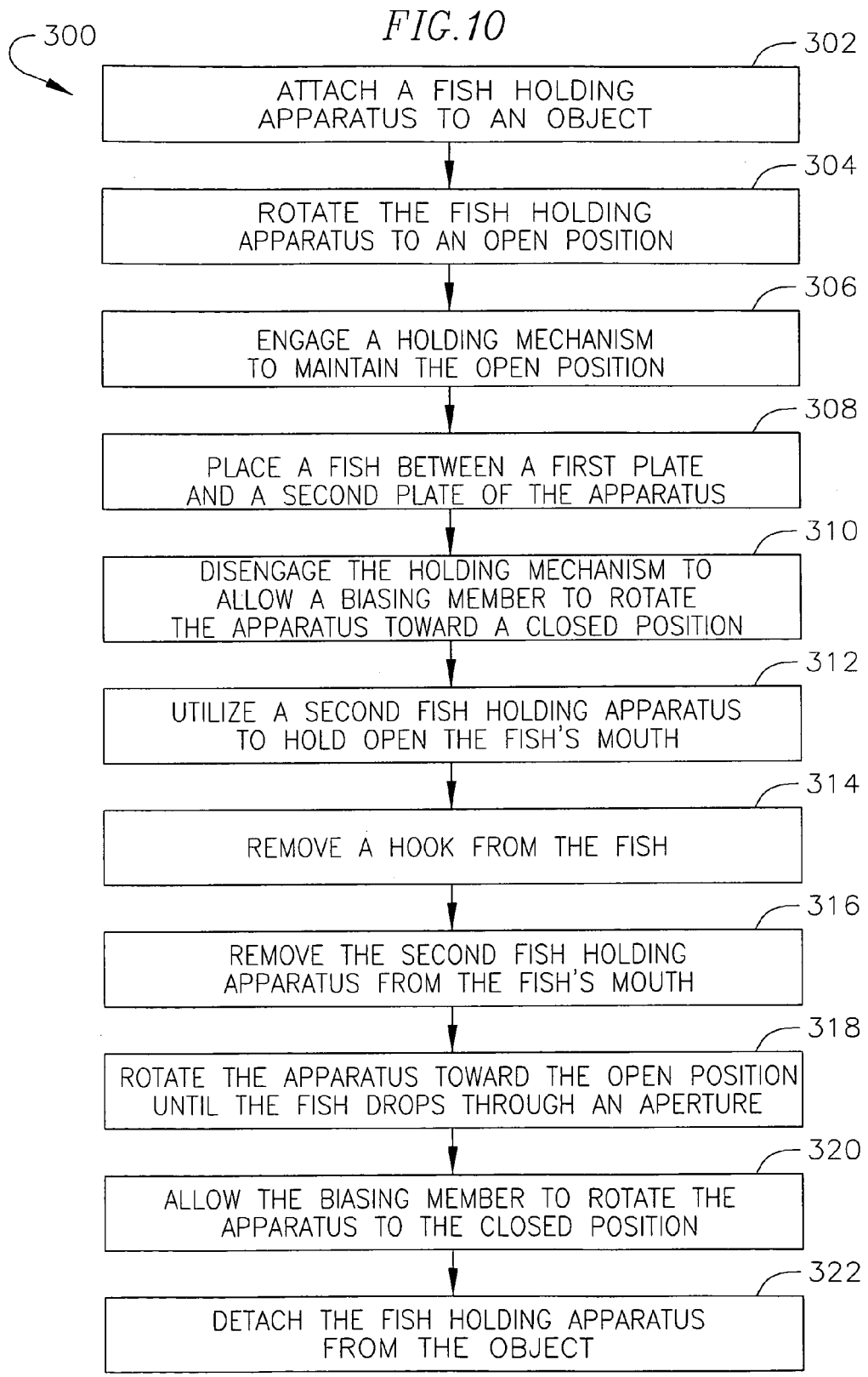

FISH HOLDING APPARATUS AND METHOD OF USING SAME

FIELD OF THE INVENTION

The present invention relates to fishing devices, and more particularly to an apparatus for holding a fish and methods of using the same.

BACKGROUND OF THE INVENTION

Fishing is an extremely popular sport among individuals of various ages. However, a difficult and frustrating part of the activity is the problem of removing a hook from a fish after bringing the fish into a boat or onto the shore. This task can be especially difficult when the fish is still alive and struggling to free itself.

The task of removing a fishing hook from a live fish may cause injury to the handler due to cuts or abrasions caused by the fins or scales of the fish, or by the hook itself. The chances of injury are increased where a fish is large and/or struggling to free itself.

Additionally, the process of removing a hook from a fish is dangerous to the fish. The breathing functions of a fish may be harmed as a result of extended handling outside of its aqueous environment. In addition, a fish may be squeezed, dropped, or may be susceptible to bacterial infection caused by contact with a human hand. Also, it is very likely that any harm inflicted by the hook itself will be exacerbated by movement of the struggling fish.

Often fishers wish to release a fish that has been caught and return it to the water. In this case, it is important that the fish be firmly held so that the hook can be removed quickly and carefully so that the fish can be returned to the water promptly and with minimal harm.

For the reasons mentioned above, it is generally agreed among fishers and conservationists that it is advantageous to remove a hook from a fish quickly and with minimal handling. As a result, several tools, such as "hook-out pliers" or needle-nosed pliers, have been designed and used for removing hooks from fish.

SUMMARY OF THE INVENTION

Aspects of embodiments of the present invention are directed toward an apparatus for holding a fish and methods of using the apparatus. Embodiments of a fish holding apparatus of the present invention are configured to prevent a live fish from moving so that a fishing hook can quickly and easily be removed from the fish. Another aspect of embodiments of the present invention is a fish holding apparatus configured to firmly hold a fish immobile, but without crushing or puncturing it, while a hook is removed from the fish, thereby reducing harm to both the fish and the handler. Another aspect of embodiments of the present invention is a fish holding apparatus configured to allow a fish to be released back into the water after a hook is removed without being touched by the handler. Still another aspect of embodiments of the present invention is a fish holding apparatus configured to open the mouth of a fish wide to facilitate removing a hook while allowing the hands of a handler to remain free to quickly remove the hook.

A fish holding apparatus according to an embodiment of the present invention includes: a first plate having a bottom edge, a top edge, and an inner face; a second plate coupled to the first plate, the second plate having a bottom edge, a top edge, and an inner face opposite the inner face of the first plate, the second plate rotatable relative to the first plate about a horizontal rotation axis proximate and substantially parallel to the bottom edge of the first plate; a biasing member configured to bias the fish holding apparatus toward a closed position; and a holding mechanism configured to maintain the fish holding apparatus in an open position, a distance between the top edge of the second plate and the top edge of the first plate in the open position greater than a distance between the top edge of the second plate and the top edge of the first plate in the closed position.

In one embodiment, a fish holding apparatus includes an aperture in at least one of the first and second plates, the aperture configured to allow a fish to drop through the aperture when the second plate is rotated relative to the first plate toward the open position. In one embodiment, the aperture is in the second plate.

In one embodiment, a fish holding apparatus includes cushioning material on the inner face of at least one of the first and second plates. In one embodiment, the cushioning material is neoprene.

In one embodiment, a fish holding apparatus includes an attaching mechanism configured to attach the fish holding apparatus to an object. In one embodiment, the attaching mechanism includes an adjustable clamping mechanism configured to attach the fish holding apparatus to a bucket.

In one embodiment, the holding mechanism is configured to maintain a fish holding apparatus in a plurality of open positions.

In one embodiment, the biasing member includes a torsion spring.

In one embodiment, an inner face of at least one of the first and second plates includes at least one concave surface.

In one embodiment, the first plate includes at least one slot near the bottom edge of the first plate; the second plate includes at least one tab near the bottom edge of the second plate, the at least one tab configured to be inserted in the at least one slot of the first plate; and the second plate is coupled at the at least one tab to the first plate at the at least one slot.

In one embodiment, a fish holding apparatus includes a shelf configured to support at least one fishing device.

In another embodiment of the invention, a fish holding apparatus (a "caliper") configured to hold open the mouth of a fish includes an elongated wire including: a first end having a prong extending at an outward angle; a second end having a prong extending at an outward angle; a spring loop substantially near the midpoint of the elongated wire; a first arm extending from the spring loop to the first end and having a length; and a second arm extending from the spring loop to the second end, the second arm spaced from and substantially parallel to the first arm, and the second arm having a length slightly greater than the length of the first arm. The spring loop is configured to produce a spring force biasing the fish holding apparatus toward an open position, the first and second ends spaced apart in the open position. The prongs of the first and second ends are configured to interlock, thereby maintaining the fish holding apparatus in a closed position against the spring force of the spring loop.

In one embodiment, a fish holding apparatus includes a first arm loop between the first end and the spring loop, and a second arm loop between the second end and the spring loop, the first and second arm loops configured to facilitate a user in gripping and adjusting the fish holding apparatus toward the closed position.

In another embodiment of the invention, a method of using a fish holding apparatus having a first plate, a second plate rotatable relative to the first plate about a rotation axis, a biasing member, and a holding mechanism includes: placing the fish between the first and second plates, the length of the fish substantially perpendicular to the rotation axis; and disengaging the holding mechanism, the biasing member rotating the second plate relative to the first plate about the rotation axis, thereby biasing the fish holding apparatus toward a closed position.

In one embodiment, a method of using a fish holding apparatus further includes: rotating the second plate relative to the first plate to an open position before placing the fish between the first and second plates; and engaging the holding mechanism to maintain the fish holding apparatus in the open position.

In one embodiment, a method of using a fish holding apparatus further includes removing a hook from the fish.

In one embodiment, a method of using a fish holding apparatus further includes rotating the second plate relative to the first plate toward an open position until the fish drops through an aperture in one of the plates.

In one embodiment, a method of using a fish holding apparatus further includes attaching the fish holding apparatus to an object before placing the fish between the first and second plates.

In one embodiment, a method of using a fish holding apparatus further includes utilizing a device to hold the mouth of the fish open.

BRIEF DESCRIPTION OF THE DRAWINGS

These and other features and aspects according to exemplary embodiments of the present invention will become better understood in reference to the following description, appended claims, and accompanying drawings where:

FIG. 10 is a flow diagram of a method of using a fish holding apparatus according to aspects of the present invention.

DETAILED DESCRIPTION

Figure 1:
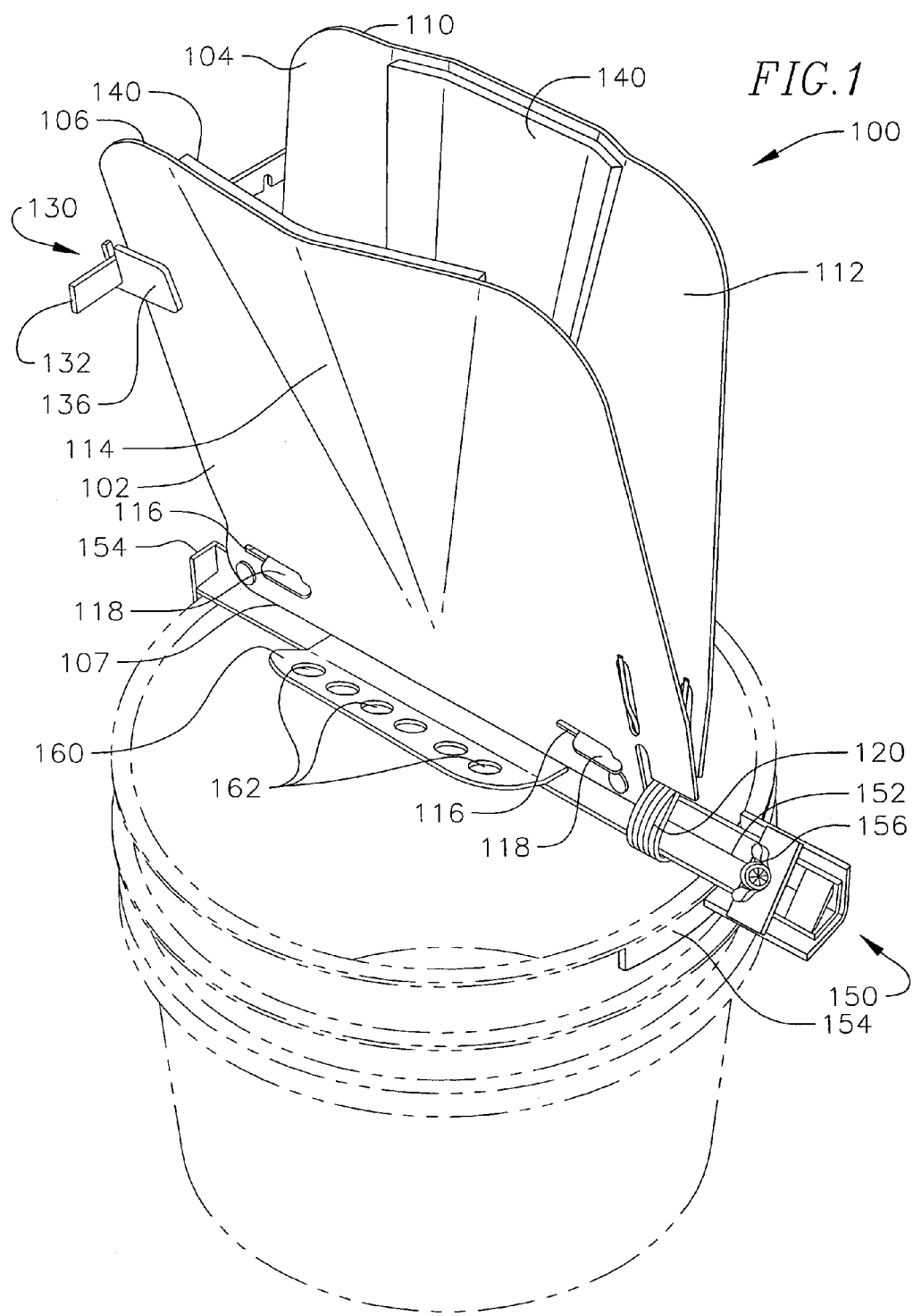
FIG. 1 is a front perspective view of a fish holding apparatus in an open position according to an embodiment of the present invention.

In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

With reference to FIGS. 1-6, a fish holding apparatus 100 includes a first plate 102 and a second plate 104. In the present embodiment, the first and second plates 102, 104 are formed of aluminum. This material is advantageous for use in forming the first and second plates 102, 104 because it is rigid, durable, lightweight, corrosion-resistant, easily cleaned, and relatively inexpensive. The first and second plates 102, 104 may alternatively be made from any other suitable material (e.g., polypropylene, polyethylene, steel, titanium, graphite, fiberglass, and other plastics). Furthermore, each of the first and second plates 102, 104 may be formed from a single piece of material or from two or more pieces welded, fastened, or otherwise connected together. Alternatively, the first and second plates 102, 104 may be formed by any other suitable method, such as injection molding.

In the embodiment shown in FIGS. 1-6, in which the fish holding apparatus 100 is configured to be attached to a 5-gallon bucket, the first and second plates 102, 104 are between approximately 9 inches (22.9 cm) and approximately 12 inches (30.5 cm) wide, and between approximately 10 inches (25.4 cm) and approximately 14 inches (35.6 cm) long (between a top edge and a bottom edge). However, the geometric dimensions of the first and second plates 102, 104, as well as those of the other components of the fish holding apparatus 100, may be any suitable dimensions without departing from the invention. For example, the first and second plates 102, 104 and other components of the fish holding apparatus 100 may be sized according to the size of the fish to be held and/or the object to which the fish holding apparatus 100 is to be attached.

Figure 2:
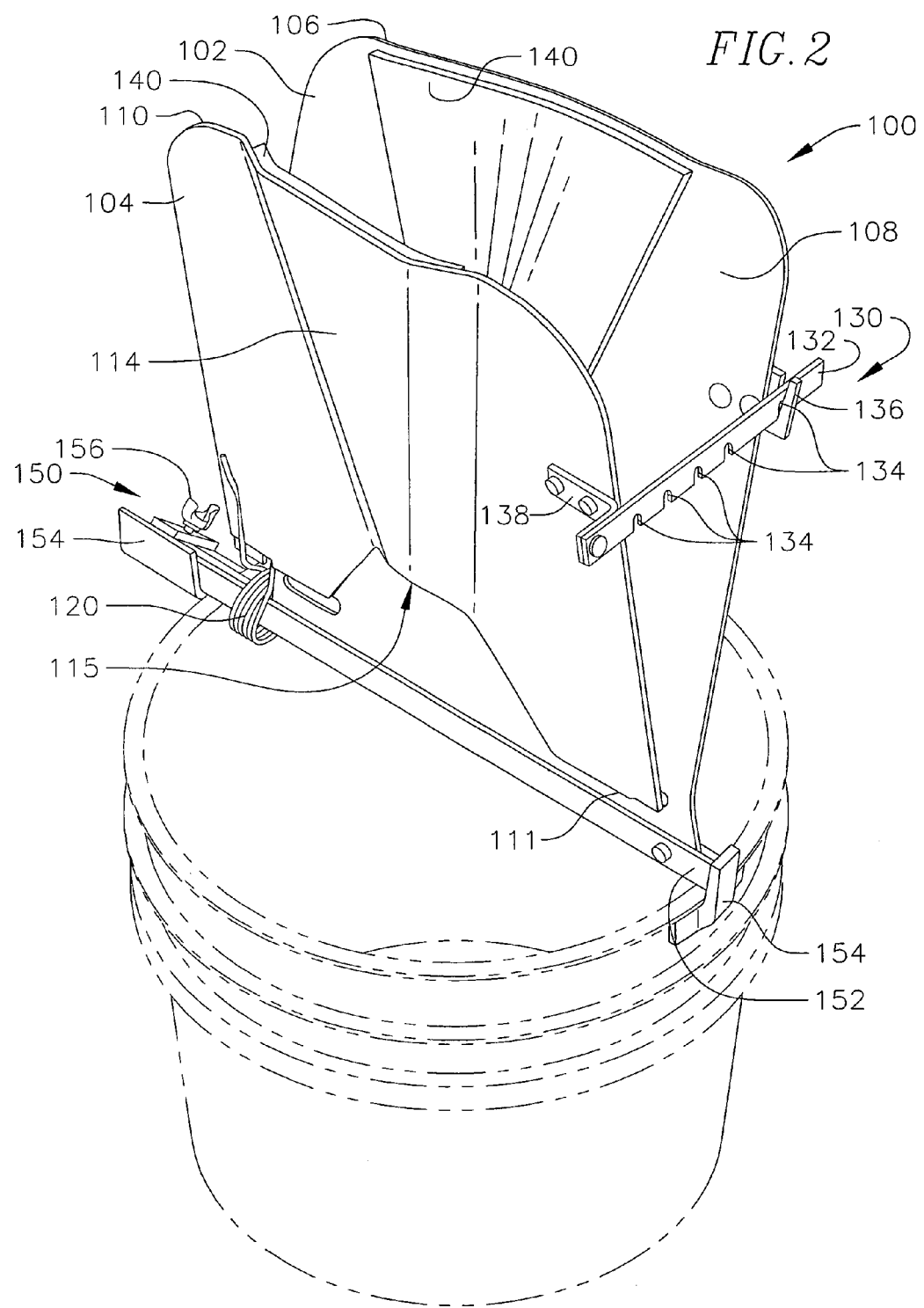
FIG. 2 is a rear perspective view of the fish holding apparatus of FIG. 1 in an open position.
Figure 3:
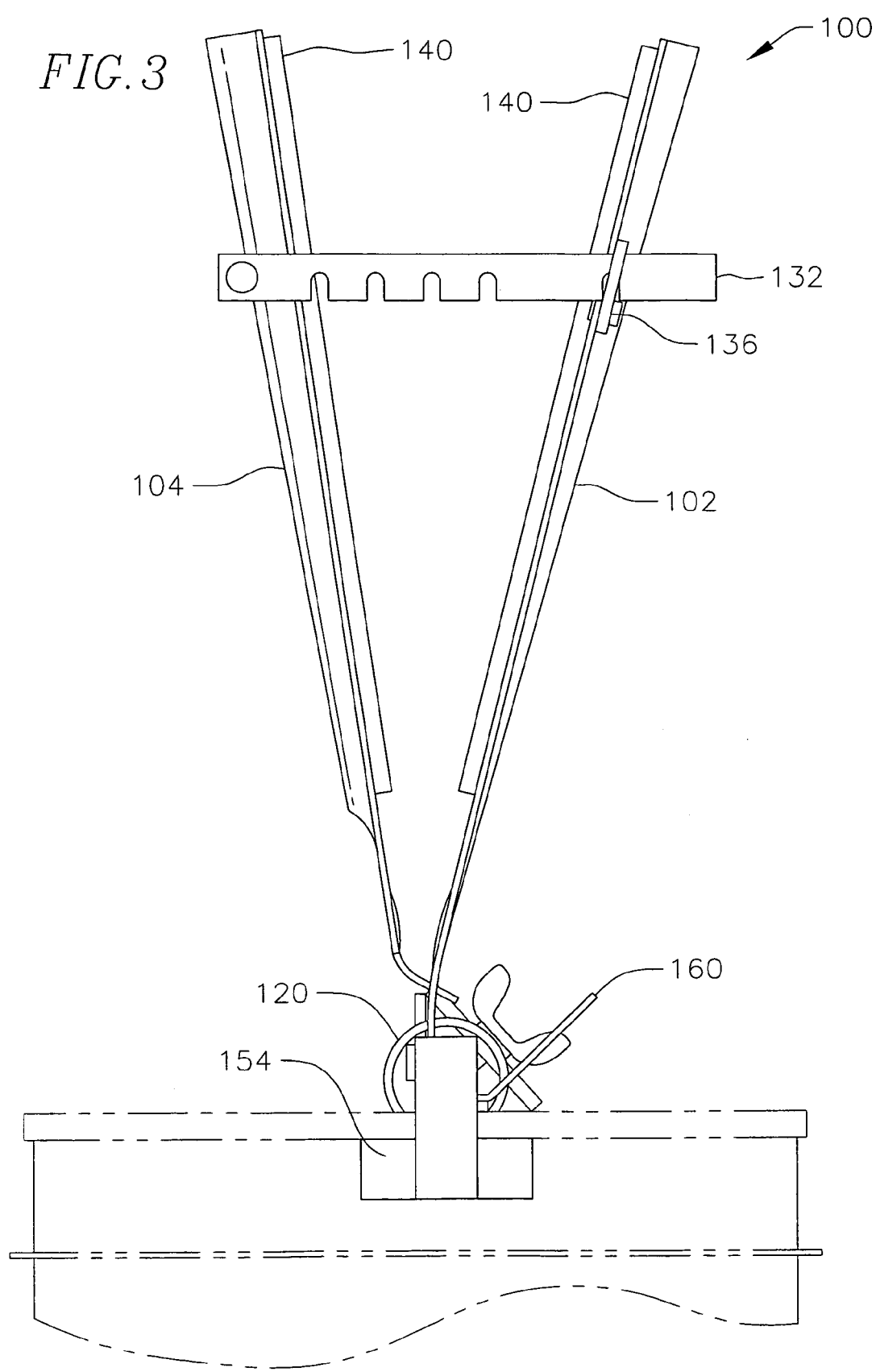
FIG. 3 is a side view of the fish holding apparatus of FIG. 1 in an open position.
Figure 4:
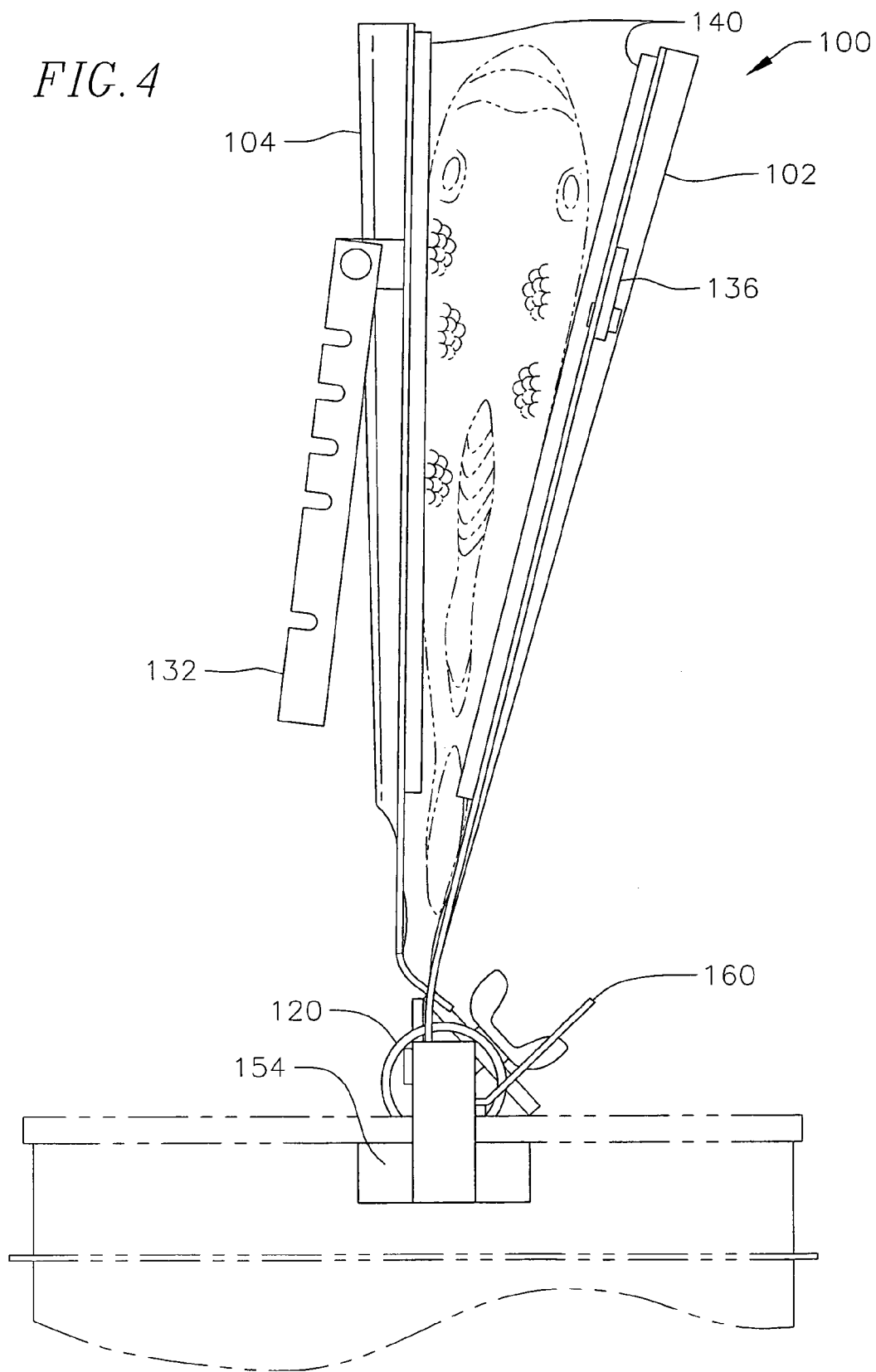
FIG. 4 is a side view of the fish holding apparatus of FIG. 1 holding a fish.
Figure 5:
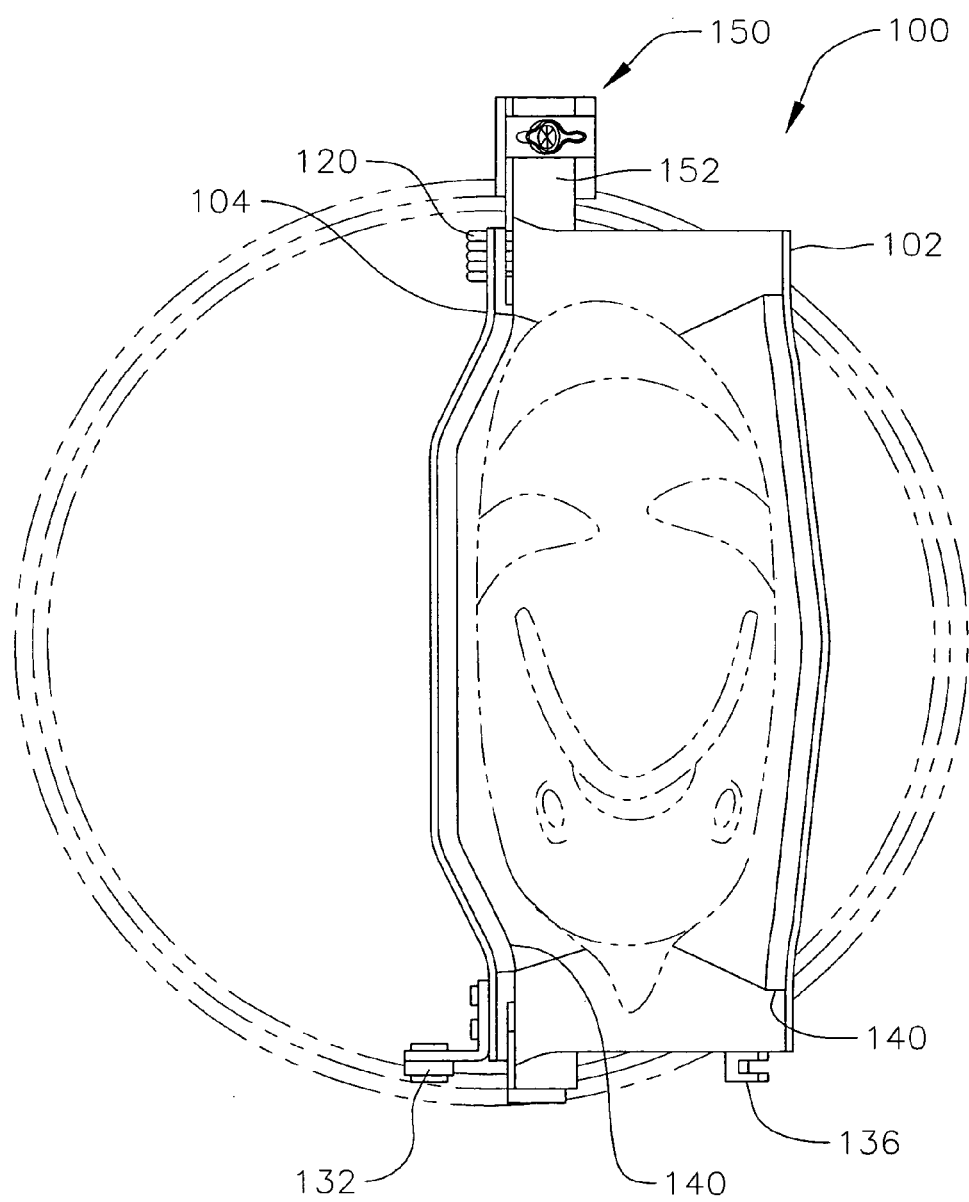
FIG. 5 is a top view of the fish holding apparatus of FIG. 1 holding a fish.
Figure 6:
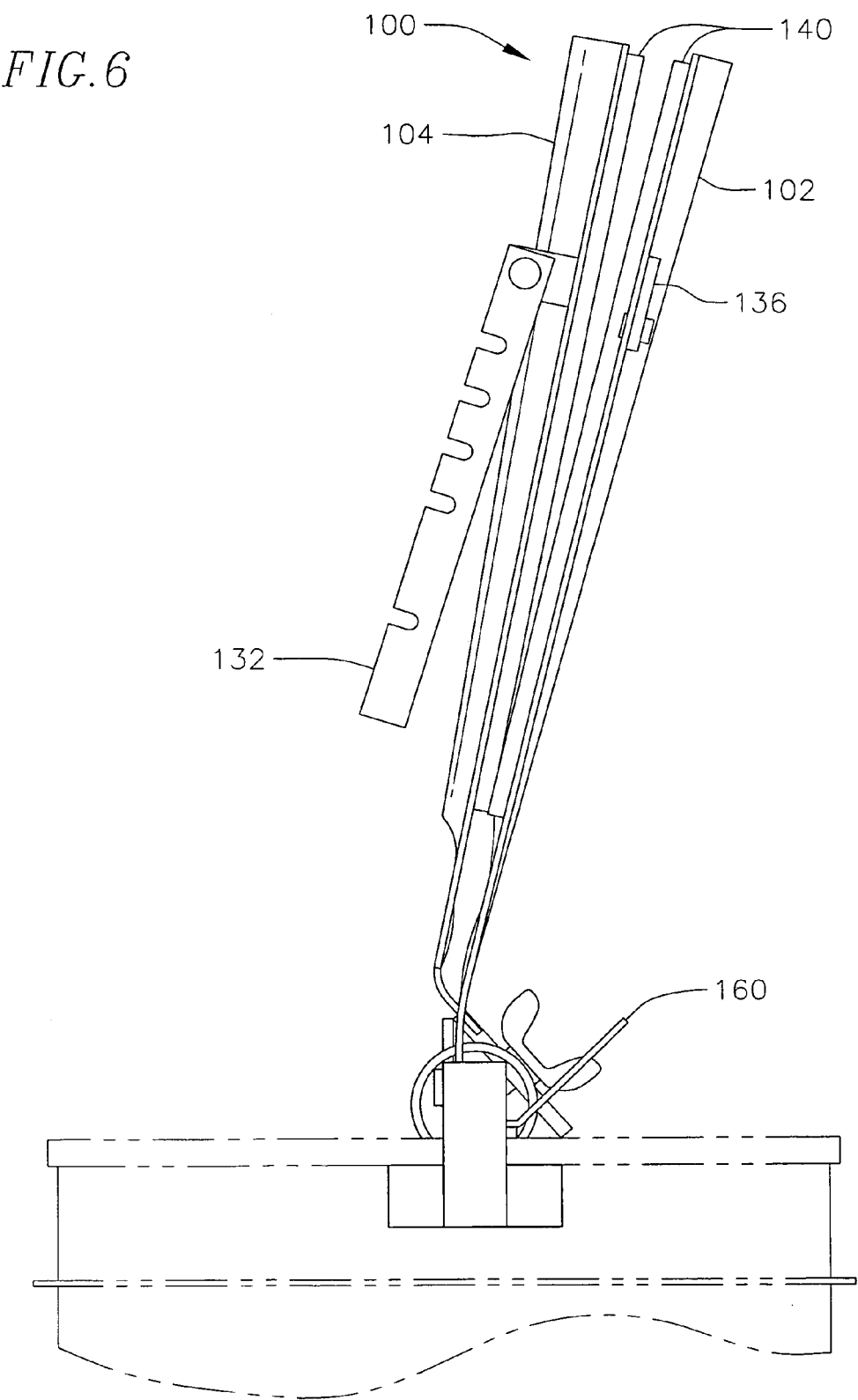
FIG. 6 is a side view of the fish holding apparatus of FIG. 1 in a closed position.

The first plate 102 has a top edge 106, a bottom edge 107, and an inner face 108. The second plate 104 also has a top edge 110, a bottom edge 111, and an inner face 112. The inner face 108 of the second plate 104 is opposite the inner face 112 of the first plate 102. Also, in the present embodiment, each of the inner faces 108, 112 includes a concave surface 114 configured to better hold a fish without crushing it. Additionally, as shown in FIG. 2 in the present embodiment, the second plate 104 may include an aperture 115 positioned and sized such that when the top edge 110 of the second plate 104 is rotated away from the top edge 106 of the first plate 102, a fish will drop through the aperture 115. As such, the size of the aperture 115 may be varied, according to the size of fish to be caught, for example. Alternatively, the first plate 102 may include an aperture.

In the present embodiment, as shown in FIGS. 1-2, two slots 116 are formed near the bottom edge 107 of the first plate 102. Additionally, there are two tabs 118 located near the bottom edge 111 of the second plate 104. The two tabs 118 are configured to be inserted in and rotated about the two slots 116 in the first plate 102. The two slots 116 may be cut or otherwise formed in the first plate 102. The two tabs 118 may be formed integrally into the shape of the second plate 104 itself, or alternatively, the two tabs 118 may be welded, fastened, riveted, or otherwise connected to the second plate 104. The size and shape of the slots 116 and the tabs 118 may be varied without departing from the invention, so long as the tabs 118 may be inserted into the slots 116 such that the second plate 104 is supported and rotatable about the first plate 102. In other embodiments, other suitable devices and methods may be used to couple the second plate 104 to the first plate 102.

The fish holding apparatus 100 includes a biasing member 120 configured to bias the first and second plates 102, 104 toward a closed position. In the present embodiment, the biasing member 120 is a torsion spring. The torsion spring may have any size and stiffness suitable for biasing the first and second plates 102, 104 toward a closed position and may be chosen based on the size of the first and second plates 102, 104. In one embodiment, the biasing member 120 is configured to produce approximately one (1) pound per square inch of pressure near the top edges 106, 110 of the first and second plates 102, 104 and approximately three (3) pounds per square inch of pressure near the bottom edges 107, 111 of the first and second plates 102, 104. The material of the torsion spring may be a spring steel or stainless steel, or another suitable material having the required stiffness and/or corrosion resistance. The biasing member 120 may alternatively include a tension spring, a compression spring, a piston, or any other suitable device or combination of one or more devices.

The present embodiment of the fish holding apparatus 100 also includes a holding mechanism 130 configured to prevent the biasing member 120 from rotating the fish holding apparatus 100 to the closed position. The holding mechanism 130 may be any suitable device, such as a latch, a hook, a screw, or a pin. In the present embodiment, the holding mechanism 130 is a latch 132 that is rotatable to either an engaged position or a disengaged position. The latch 132 has a plurality of slots 134 configured to engage the holding mechanism 130 such that the fish holding apparatus 100 may be maintained in various open positions. A desired open position of the fish holding apparatus 100 may be chosen based on a size of a fish to be held. The holding mechanism 130 may be engaged by rotating the latch 132 until one of the slots 134 is engaged by a catch 136. Additionally, the holding mechanism 130 may include a latch support 138 for rotatably connecting the latch 132 to one of the first and second plates 102, 104. The latch 132, the catch 136, and the latch support 138 may be formed of any suitable material, such as aluminum or steel.

The fish holding apparatus 100 may further include cushioning material 140 on the inner face 108, 112 of either or both of the first and second plates 102, 104. The cushioning material 140 is configured to absorb pressure on a fish held between the inner faces 108, 112 of the first and second plates 102, 104 produced by the biasing member 120. In one embodiment, the cushioning material 140 is also configured to provide a surface with suitable friction for holding a live fish. In the present embodiment, the cushioning material 140 covers portions of the inner faces 108, 112, respectively, of the first and second plates 102, 104, where a fish would be held. The cushioning material 140, in the present embodiment, is located on the concave surfaces 114 of the inner faces 108, 112. The cushioning material 140 is preferably formed from a material having a low hardness value that is also water-resistant and easily cleaned. In the present embodiment, the cushioning material 140 is formed of neoprene. However, other suitable materials may alternatively be used to form the cushioning material 140.

According to the present embodiment, the fish holding apparatus 100 also includes an attaching mechanism 150 configured to attach the fish holding apparatus 100 to an object. For example, as shown in FIGS. 1-6, the attaching mechanism 150 may be an adjustable clamp configured to attach the fish holding apparatus 100 to a bucket. Alternatively, the attaching mechanism 150 may be configured to attach the fish holding apparatus 100 to any other desired container or object, such as a well or side of a boat.

In the present embodiment, the attaching mechanism 150 includes a crossbar 152 configured to support the fish holding apparatus 100 on a bucket. The crossbar 152 may be formed from any suitable material, such as aluminum, having a cross section of angle, tube, channel, or any shape suitable for supporting the weight of the fish holding apparatus 100 and a fish. The attaching mechanism 150 may include clamps 154 at one or both ends of the crossbar 152. The clamps 154 may have a plate having a rounded surface having a radius substantially equal to the radius of a bucket. One or both of the clamps 154 may be positionable along the length of the crossbar 152, and also relative to the sides of a bucket, and such position may be maintained by tightening a wing nut 156 or other fastener. Of course, the attaching mechanism 150 may include any other suitable device or configuration for attaching the fish holding apparatus to an object.

The fish holding apparatus 100 may also include a shelf 160 configured to support at least one fishing device. For example, the shelf 160 of the fish holding apparatus 100 may be used to hold a second fish holding apparatus according to another embodiment of the invention, the second fish holding apparatus, described in detail below, configured to hold open the mouth of a fish. The shelf 160 may further be configured to hold any other tools, and may include one or more holes 162 for this purpose to prevent the tools from sliding off the shelf 160. The shelf 160 may be formed of any suitable material, such as aluminum, steel, fiberglass, or a plastic.

The fish holding apparatus 100 is assembled by coupling the first plate 102 to the second plate 104. The first and second plates 102, 104 may be coupled via one or more hinge devices. Furthermore, the hinge devices may be formed into (i.e. as an integral part of) the first and/or second plates 102, 104 themselves. For example, as described above and depicted in FIGS. 1-2, one or more tabs 118 may be formed at the bottom of the second plate 104, the one or more tabs 118 of the second plate 104 configured to be inserted in and rotated about one or more corresponding slots 116 in the first plate 102. Alternatively, any suitable device, other than tabs and slots, may be used for coupling the first and second plates 102, 104 such that the second plate 104 is rotatable about the first plate 102.

The biasing member 120 may be connected to the first and second plates 102, 104 by any suitable device. In the present embodiment, the biasing member 120 is a torsion spring having a length of wire at each end extending through a slot or cutout formed in each of the first and second plates 102, 104.

The holding mechanism 130 may also be connected to the fish holding apparatus 100 by any suitable device. In the present embodiment, the latch support 138 of the holding mechanism 130 is riveted to the second plate 104, and the catch 136 is riveted to the first plate 102. The latch 132 is riveted or connected by a pin to the latch support 138 such that the latch 132 is rotatable relative to the latch support 138 about the rivet or pin. Of course, the holding mechanism 130, and any of the components of the holding mechanism 130, may alternatively be connected to the fish holding apparatus 100 by any other suitable device, such as by fasteners, welding, adhesive, or a combination of devices. Moreover, the holding mechanism 130, or any of the components of the holding mechanism 130, may be integrally formed into one or both of the first and second plates 102, 104. Additionally, in an alternate embodiment, the latch support 138 and/or the latch 132 may be connected to the first plate 102, and the catch 136 may be connected to the second plate 104.

The cushioning material 140 may be connected to one or both of the first and second plates 102, 104 by any suitable device. In the present embodiment, the cushioning material 140, which is a neoprene material, is connected to each of the first and second plates 102, 104 using an adhesive, such as AQUASEAL® Urethane Repair Adhesive & Sealant. Additionally, the surfaces of the first and second plates 102, 104 may first be scored, or otherwise made rough, using a grinder or other suitable abrasive device so that the adhesive may form a stronger bond. Alternatively, the cushioning material 140 may be connected to the first and second plates 102, 104 using fasteners, rivets, or any other suitable device.

The attaching mechanism 150 may be connected to the fish holding apparatus by any suitable device. In the present embodiment, the first plate 102 is riveted to the crossbar 152 of the attaching mechanism 150. The shelf 160, in the present embodiment, is also riveted to the crossbar 152 of the attaching mechanism 150. Of course, the attaching mechanism 150 and the shelf 160 may be alternatively be connected to the fish holding apparatus 100 by any other suitable devices or methods, such as welding, bonding, or fasteners. Further, the shelf 160 may be connected to the fish holding apparatus 100 by a hinge, such that the shelf 160 may be folded out of the way when not in use.

In use, the fish holding apparatus 100 may be used to hold a fish, such as during removal of a hook from the fish's mouth. Moreover, the fish holding apparatus 100 is particularly suited for holding immobile a live fish which is struggling to free itself, while inflicting minimal injury to the fish, as well as to the handler. A method 300 of using the fish holding apparatus 100 is described in further detail below, in conjunction with the flow diagram of FIG. 10.

Figure 7:
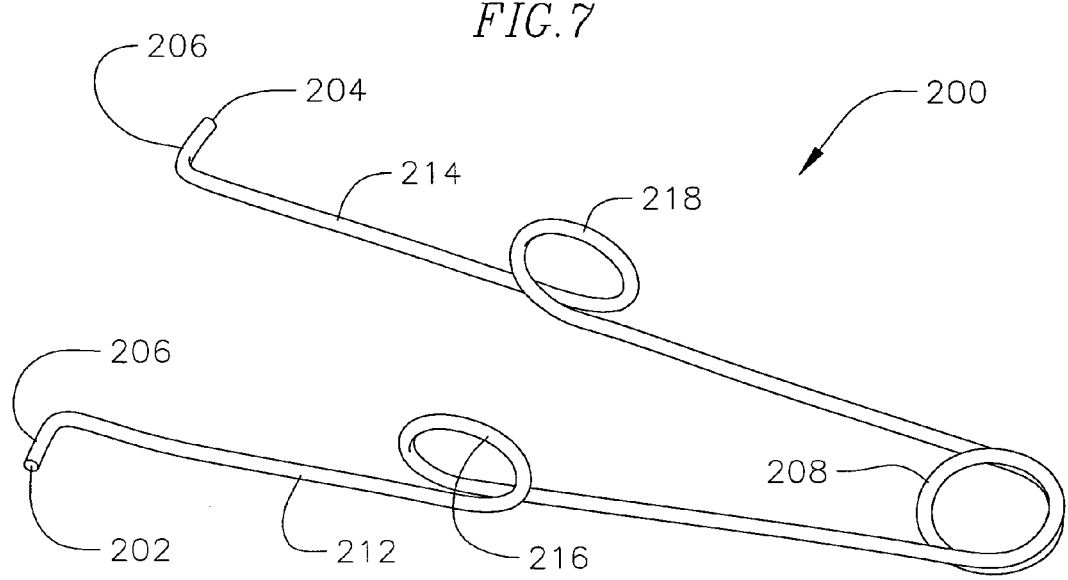
FIG. 7 is a perspective view of a fish holding apparatus in an open position according to another embodiment of the present invention.
Figure 8:
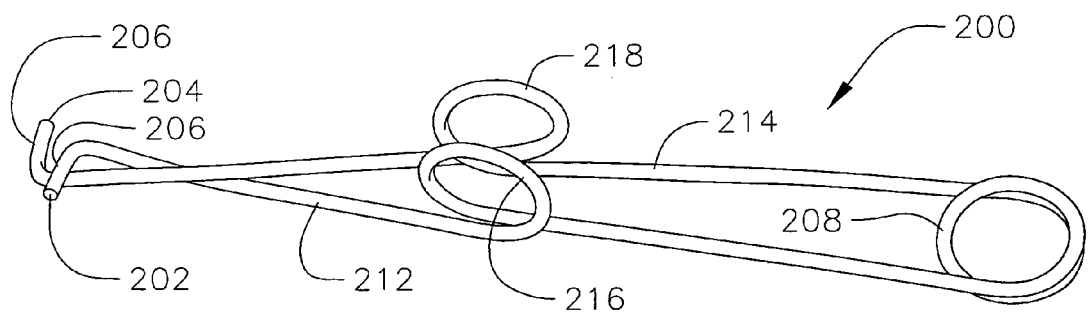
FIG. 8 is a perspective view of the fish holding apparatus of FIG. 7 in a closed position.
Figure 9:
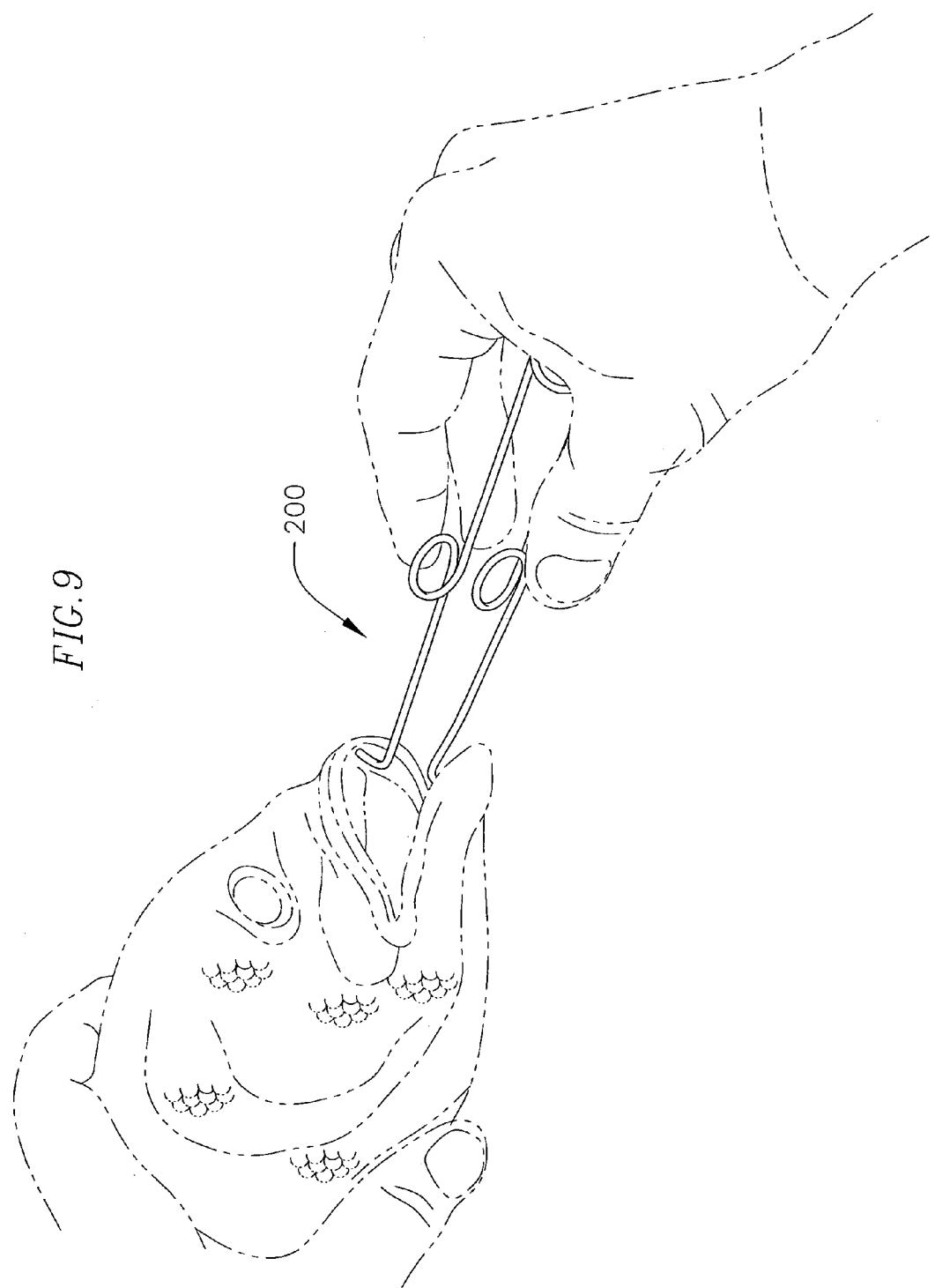
FIG. 9 is a perspective view of the fish holding apparatus of FIG. 7 holding a fish.

With reference to FIGS. 7-9, another embodiment of a fish holding apparatus 200 (a "caliper" or "fish mouth holding device") includes an elongated wire 202. The fish holding apparatus 200, according to one embodiment, is formed from spring steel. This material is well-suited for forming the fish holding apparatus 200 because of its strength, stiffness, durability, and low cost. Alternatively, the fish holding apparatus 200 may be formed from any other suitable material. Moreover, the gage of the wire may be varied depending on the spring force and/or stiffness that is desired for the particular embodiment of the fish holding apparatus 200. For example, an embodiment of the fish holding apparatus 200 which will be used primarily to hold larger fish may be formed using a heavier gage of wire, whereas another embodiment of the fish holding apparatus 200 which will be used to hold smaller fish may be formed using a lighter gage of wire.

The fish holding apparatus 200 is formed by bending a length of wire into substantially the shape shown in FIGS. 7-9. Any suitable tools may be used for bending the wire (e.g., pliers, locking pliers, or a vise). After the fish holding apparatus 200 has been formed to the desired shape, in one embodiment, it is heated at between approximately 300 degrees Fahrenheit and approximately 400 degrees Fahrenheit for between approximately 30 and approximately 60 minutes.

The wire of the fish holding apparatus 200 has a first end 202 and a second end 204. Each of the first and second ends 202, 204 has a prong 206. Each of the two prongs 206 extends outwardly away from either the first end 202 or the second end 204 at an angle. As shown in FIG. 7 the prongs 206 may extend away from the first and second ends 202, 204 at angles of approximately 90 degrees. However, greater or lesser angles may alternatively be formed because such various angles will also be suited to orient the prongs 206 for grasping the inside of the mouth of a fish.

In the present embodiment of the fish holding apparatus 200, a spring loop 208 is formed generally near the midpoint of the wire. The spring loop 208 may be formed using a single loop or multiple loops, depending on the amount of spring force desired. For instance, an embodiment of the fish holding apparatus 200 to be used in holding open the mouths of large fish may require a greater spring force and may therefore be formed with a spring loop 208 having multiple loops. Alternatively, an embodiment of the fish holding apparatus 200 to be used to hold open the mouths of small fish may include a spring loop 208 having a single loop, as depicted in FIGS. 7-8.

The fish holding apparatus 200 includes a first arm 212 extending between the spring loop 208 and the first end 202. The fish holding apparatus 200 also includes a second arm 214 extending between the spring loop 208 and the second end 204. The first arm 212 is spaced from the second arm 214 by a distance approximately equal to the diameter of the spring loop 208. Also, the first arm 212 is generally parallel to the second arm 214, although depending on whether the fish holding apparatus 200 is in an open position or a closed position (i.e. whether the first and second ends 202, 204 are spaced apart or the prongs 206 of the first and second ends 202, 204 are interlocked) the distance between the first and second arms 212, 214 may either gradually increase slightly or decrease slightly along the first and second arms 212, 214 from the spring loop 208 to the first and second ends 202, 204.

Between each of the first and second ends 202, 204, there may be one or more loops or other features configured to facilitate a user in holding the fish holding apparatus 200 and/or pressing the first and second ends 202, 204 together toward a closed position. As shown in FIGS. 7-9, the present embodiment of the fish holding apparatus 200 includes a first arm loop 216 on the first arm 212 approximately midway between the first end 202 and the spring loop 208, and a second arm loop 218 on the second arm 214 approximately midway between the second end 204 and the spring loop 208.

In the present embodiment of the fish holding apparatus 200, as depicted in FIG. 8, the distance from the second end 204 to the spring loop 208 is slightly greater than the distance from the first end 202 to the spring loop 208. That is, the second arm 214 may be slightly longer than the first arm 212. Such a configuration facilitates interlocking of the prongs 206 when a user presses concurrently on the first and second arm loops 216, 218 or elsewhere between the spring loop 208 and each of the first and second ends 202, 204. Alternatively, the distance from the second end 204 to the spring loop 208 may be substantially equal to the distance from the first end 202 to the spring loop 208.

In use, the fish holding apparatus 200 may be used to hold the mouth of a fish open, as shown in FIG. 9, such as during removal of a hook from the mouth of the fish. One of the aspects of the fish holding apparatus 200 is that a person utilizing it may retain both hands free to remove a hook from the fish or perform some other task. That is, the fish holding apparatus 200 is configured to hold open the mouth of a fish in an unrestrained condition.

To use the fish holding apparatus 200, a user may concurrently press on the first and second arm loops 216, 218 or anywhere near each of the first and second ends 202, 204. This pressure counteracts the spring force produced by the spring loop 208, thereby separating the prongs 206 on the first and second ends 202, 204. After the prongs 206 are separated, the user may relax his/her hand by a sufficient amount such that the spring force of the spring loop 208 pushes the first and second ends 202, 204 apart from each other. While the first and second ends 202, 204 are near each other, the prongs 206 may be put inside the mouth of a fish so that as the spring force of the spring loop 208 pushes the first and second ends 202, 204 apart, the mouth of the fish is opened and thereafter held open by the prongs 206 due to the spring force of the spring loop 208.

After having removed a hook from the mouth of the fish, or when it is otherwise desired to close the fish's mouth, a user may concurrently press on each of the first and second arm loops 216, 218 or anywhere near each of the first and second ends 202, 204. This pressure will move the first and second ends 202, 204 together until they can be extracted from the fish's mouth. The first and second ends 202, 204 may further be pressed together so that the prongs 206 interlock and maintain the fish holding apparatus 200 in a closed storage position against the spring force of the spring loop 208.

FIG. 10 is a flow diagram showing tasks of a method 300 of using a fish holding apparatus. For the sake of clarity, the tasks of the method 300 are described below as performed by using the fish holding apparatus 100 according to an embodiment of the invention, as described above. Of course, the method 300 of using a fish holding apparatus, as described below, may be performed using an embodiment of a fish holding apparatus other than the embodiments described above.

The method 300 of using the fish holding apparatus 100 may be commenced with task 302. Task 302 includes attaching the fish holding apparatus 100 to an object. The object may be any object desired by the person performing the method 300. Several especially suitable objects to which the fish holding apparatus 100 may be attached include a bucket, the side or other portion of a fishing boat, or a container. The fish holding apparatus 100 may be attached to the object using the attachment mechanism 150.

Task 304 includes rotating the second plate 104 relative to the first plate 102 until the fish holding apparatus 100 is in an open position. A user may simply grasp the second plate 104 near its top edge and pull it away from the top edge of the first plate 102, causing the second plate 104 to rotate relative to the first plate 102 about a rotation axis proximate and substantially parallel to the bottom edge of the first plate 102. The user must apply sufficient force in order to overcome the force of the biasing member 120 biasing the fish holding apparatus 100 toward a closed position.

Having rotated the fish holding apparatus 100 to an open position, a user may engage the holding mechanism 130 (task 306) to maintain the fish holding apparatus 100 in the open position. The holding mechanism 130 is engaged in order to prevent the biasing member 120 from biasing the fish holding apparatus 100 toward a closed position.

Task 308 includes placing a fish between the first plate 102 and the second plate 104. If a hook is to be removed from the fish's mouth, the fish should be placed between the first and second plates 102, 104 in a vertical orientation with the tail at the bottom and the head at the top. Such an orientation of the fish will facilitate access to the mouth and quick removal of the hook.

Task 310 includes disengaging the holding mechanism 130, thereby causing the biasing member 120 to rotate the fish holding apparatus 100 toward a closed position. As soon as the holding mechanism 130 is disengaged, the biasing member 120 will cause the second plate 104 to rotate relative to the first plate 102 such that the top edges of the first and second plates 102, 104 become increasingly closer to each other. At some point, before the fish holding apparatus 100 reaches the closed position, the second plate 104 cannot rotate any further because the inner faces of both the first and second plates 102, 104 will press against the fish, thus holding the fish firmly and generally immobile.

While the fish is being held immobile in the fish holding apparatus 100, the mouth of the fish may be held open (task 312) using the fish holding apparatus 200 ("caliper"), also described above.

Task 314 includes removing a hook from the fish. In removing a hook from the fish, any suitable tools, such as "hook-out pliers," may be utilized. Further, a second fish holding apparatus 200 ("caliper") may be pressed into the open mouth of the fish to grab and remove the hook.

Task 316 includes removing the fish holding apparatus 200 from the mouth of the fish. The fish holding apparatus 200 may be removed by pressing concurrently on the two arms 212, 214 of the fish holding apparatus 200, thereby countering the spring force and pushing the two prongs 206 closer together. When the two prongs 206 are sufficiently close together, the fish holding apparatus 200 may be extracted from the fish's mouth.

Task 318 includes rotating the fish holding apparatus 100 toward an open position (i.e. by rotating the second plate 104 relative to the first plate 102 such that the top edge of the second plate 104 moves away from the top edge of the first plate 102), such as after a hook has been removed from the fish. With the fish holding apparatus 100 rotated toward an open position, the fish may be manually pulled from the fish holding apparatus 100. Alternatively, if one or both of the first and second plates 102, 104 have an aperture formed therein, the fish holding apparatus 100 may be rotated toward an open position until the fish drops through the aperture. If the fish holding apparatus 100 is attached to a bucket (task 302), the fish will drop into the bucket. Alternatively, if the fish holding apparatus 100 is attached to the side or another portion of a boat, the fish may drop back into the water or into the boat.

Task 320 includes allowing the biasing member 120 to bias the fish holding apparatus 100 to the closed position. The closed position is suitable for storing the fish holding apparatus 100 while not in use.

The fish holding apparatus 100 may be detached from the object after use (task 322), such as by detaching the adjustable clamping mechanism 150. Additionally, the fish holding apparatus 100 may be turned upside down and placed inside a bucket having a standard size (e.g., a five-gallon bucket) such that it can be carried and/or stored in the bucket.

Although the present invention has been described in certain specific embodiments, many additional modifications and variations would be apparent to those skilled in the art. For example, the plates may have varying configurations, sizes, or materials. Also, as another example, some of the tasks of the method 300 of using a fish holding apparatus may be performed in a different order than the one described above and shown in FIG. 10. Furthermore, some of the tasks of the method 300 of using a fish holding apparatus may be omitted, and/or additional tasks not described above may be included, without departing from the spirit or scope of the present invention.

It is therefore to be understood that this invention may be practiced otherwise than as specifically described. Thus, the present embodiments of the invention should be considered in all respects as illustrative and not restrictive, the scope of the invention to be determined by the claims supported by this application and their equivalents.

What is claimed is:

1. A fish holding apparatus comprising:
a first plate having a bottom edge, a top edge, and an inner face;
a second plate coupled to the first plate, the second plate having a bottom edge, a top edge, and an inner face opposite the inner face of the first plate, the second plate rotatable relative to the first plate about a horizontal rotation axis proximate and substantially parallel to the bottom edge of the first plate;
a biasing member configured to bias the fish holding apparatus toward a closed position; and
a holding mechanism configured to maintain the fish holding apparatus in an open position, a distance between the top edge of the second plate and the top edge of the first plate in the open position being greater than a distance between the top edge of the second plate and the top edge of the first plate in the closed position, wherein:

the first plate comprises at least one slot near the bottom edge of the first plate;

the second plate comprises at least one tab near the bottom edge of the second plate, the at least one tab configured to be inserted in the at least one slot of the first plate; and the second plate is coupled at the at least one tab to the first plate at the at least one slot.

2. The fish holding apparatus of claim 1, further comprising a shelf configured to support at least one fishing device.

3. The fish holding apparatus of claim 1, further comprising cushioning material on the inner face of at least one of the first and second plates.

4. The fish holding apparatus of claim 3, wherein the cushioning material comprises neoprene.

5. The fish holding apparatus of claim 1, further comprising an attaching mechanism configured to attach the fish holding apparatus to an object.

6. The fish holding apparatus of claim 5, wherein the attaching mechanism comprises an adjustable clamping mechanism configured to attach the fish holding apparatus to a bucket.

7. The fish holding apparatus of claim 1, wherein the holding mechanism is configured to selectively maintain the fish holding apparatus in one of a plurality of open positions.

8. The fish holding apparatus of claim 1, wherein the biasing member comprises a torsion spring.

9. The fish holding apparatus of claim 1, wherein the inner face of at least one of the first and second plates has at least one concave surface.

10. The fish holding apparatus of claim 1, wherein the holding mechanism comprises a latch coupled to one of the first and second plates and movable between an engaged position wherein the fish holding apparatus is maintained in the open position and a disengaged position wherein the fish holding apparatus is movable to the closed position, the latch engageable with an engaging member coupled to the other of the first and second plates.

11. The fish holding apparatus of claim 7, wherein the holding mechanism comprises a latch coupled to one of the first and second plates and movable between an engaged position wherein the fish holding apparatus is maintained in one of the plurality of open positions and a disengaged position wherein the fish holding apparatus is movable to the closed position, the latch having a plurality of slots corresponding to the plurality of open positions and configured to engage an engaging member coupled to the other of the first and second plates.

* * * * *